Figure 1:
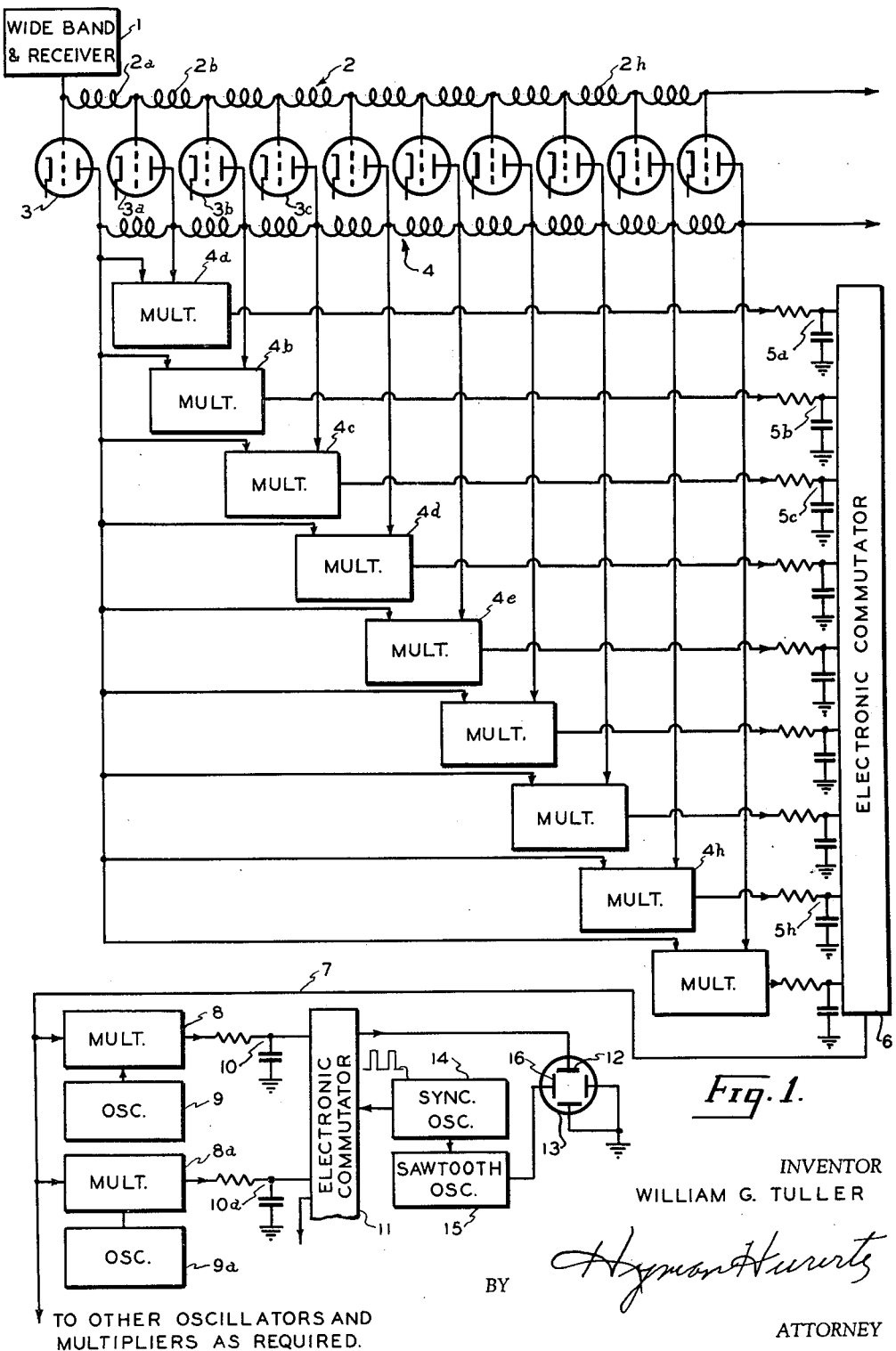

INVENTOR
WILLIAM G. TULLER
BY Hyman Hurwitz
ATTORNEY

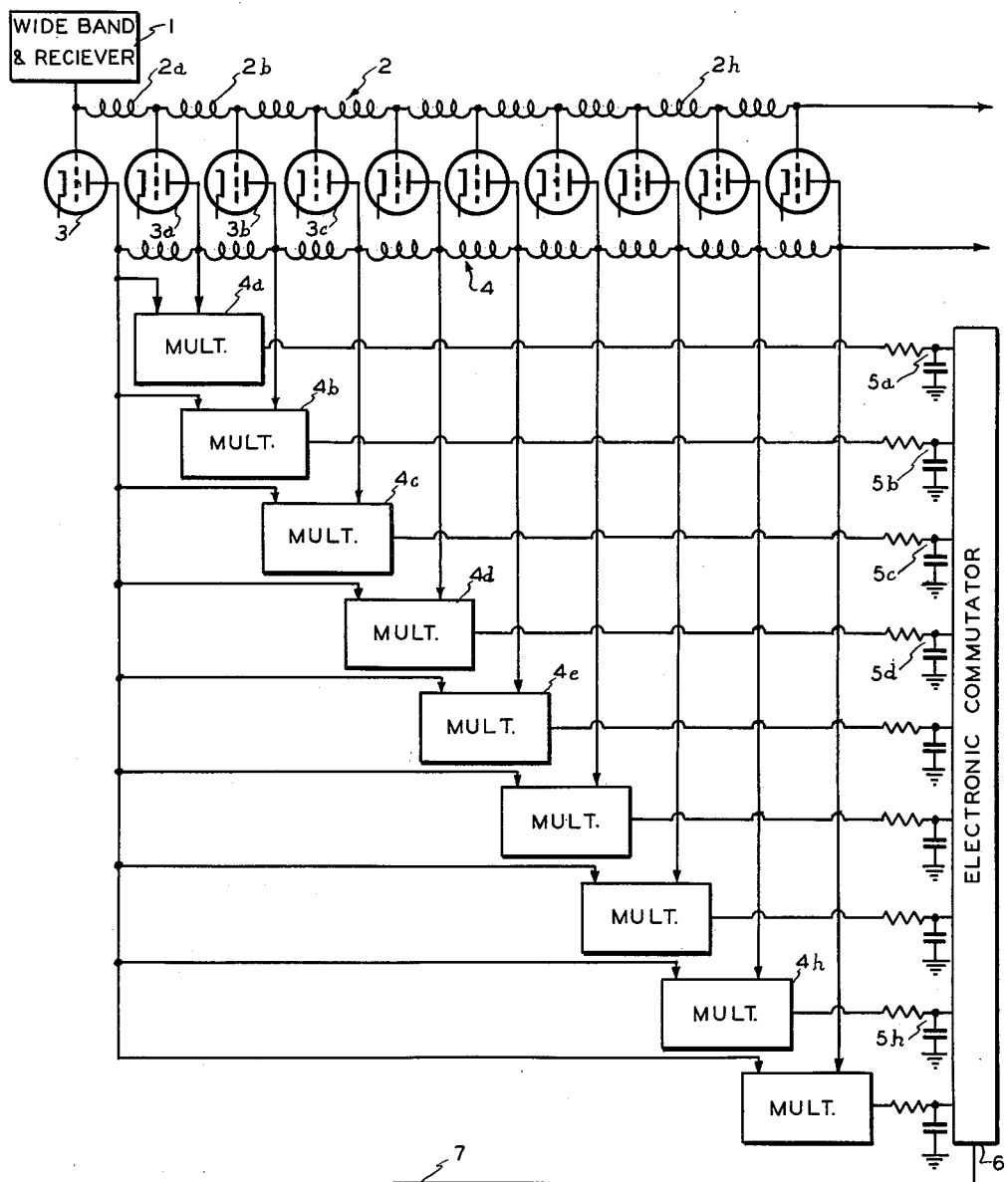
Fig. 2.
INVENTOR
WILLIAM G. TULLER
BY 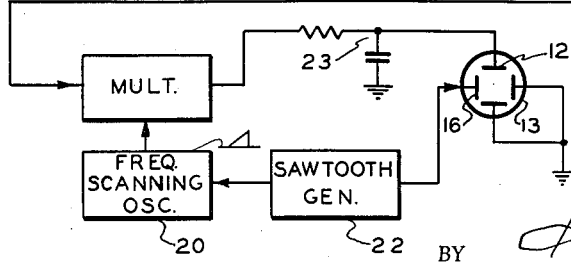
ATTORNEY

United States Patent Office 3,038,069
Patented June 5, 1962

3,038,069
SPECTRUM ANALYZERS
William G. Tuller, Arlington, Va., assignor, by mesne assignments, to Melpar, Inc., Falls Church, Va., a corporation of Delaware
Filed June 24, 1949, Ser. No. 101,221
7 Claims. (Cl. 250—20)

This invention relates generally to spectrum analyzers, and more particularly to spectrum analyzers for radio frequencies, which are capable of maintaining continuous monitoring of an extremely wide band of frequencies continuously, and without frequency scanning.

The problem of providing a search receiver for radio intercept and radio counter-measures work is an old and well known problem, which has been solved in a reasonably adequate manner for situations where the signals being monitored are continuous, are sufficiently repetitive, or are pulses of sufficiently long duration. Where so-called burst transmissions are to be monitored, i.e. transmissions which endure for only an extremely short time, the usual frequency scanning panoramic system or spectrum analyzer is not suitable, precisely because the monitoring instrument involves a scanning process. Considerations of transient response of the selective intermediate frequency amplifier of panoramic receivers requires that the scanning rate of the receivers be relatively slow if good resolution is to be obtained. Accordingly, if the signal being monitored is of very short duration, there is an excellent statistical chance that the signal will occur at one frequency and disappear again while the scanning receiver is still tuned to an entirely different frequency. Calculation shows that when one assumes reasonable scanning rates and signal durations, the chance of ever receiving a burst" signal is quite small.

It is an object of the present invention to provide a system for monitoring a wide band of frequencies without frequency scanning.

It is a further object of the invention to provide a system for monitoring a wide band of frequencies simultaneously.

It is still another object of the invention to provide a system for storing the signal components representative of a wide band frequency spectrum continuously, and for visually indicating the frequency content versus amplitude spectrum corresponding with the stored signals.

It is still another object of the invention to provide a novel system of spectrum analysis which is particularly adapted for the analysis of "burst" transmissions, or single extremely short pulse transmissions.

The above and still further objects, features and advantages of the present invention will become apparent upon consideration of the following description of two specific embodiments of the invention, especially when taken in conjunction with the accompanying drawings, wherein:

FIGURE 1 is a schematic block diagram of a signal monitoring system or spectrum analyzer, in accordance with the present invention, and FIGURE 2 is a modification of the system of FIGURE 1.

Briefly, the invention of the present method involves deriving the auto-correlation function of the incoming signal and passing this auto-correlation function through a Fourier integrator. It is well known that the Fourier integral of the auto-correlation function of a wave is the power spectrum of the wave. It can be shown that by going through the correlation and transforming processes, all signals ever present at the input of the receiver will be present at the output of the system.

Accordingly, the output of a wide band radio receiver may be employed to feed an auto-correlator, which may comprise a multi-section tapped delay line, whose input feeds one input lead of each of a group of electron multipliers, each tap on the delay line being connected to the other input lead of a different one of the multipliers. The output of the $n$th multiplier is therefore:

$$V_n = f_1(t)f_1(t+\tau_n) \tag{1}$$

where $f_1(t)$ is the signal and $\tau_n$ is the delay produced between the input of the delay line and the $n$th tap. If the output of each multiplier is lead to an integrator and averaged, we have for each integrator output $$^vI_n = \frac{1}{2T}\int_{-T}^{T} f_1(t)f_1(t+\tau_n)dt \tag{2}$$

which is, in the limit as T approaches infinity, the auto-correlation function. In practice, if T is very much greater than $\tau_n$, as will usually be the case (T being the integration time of the integrator) Equation 2 will be a very good approximation to the actual auto-correlation function. We may say, therefore, $$^vI_n \approx \Phi(\tau_n) \tag{3}$$

where $\Phi(\tau)$ is the auto-correlation function. If we scan the outputs of the integrators, we have $\Phi(\tau)$ as a time varying function. We may, therefore, pass this voltage to a Fourier integrator, which may be an electronic circuit, and obtain $$\Psi(w) = \lim_{T_o \to \infty} \int_{-T_F}^{T_F} \Phi(\tau) e^{-jw\tau} d\tau \tag{4}$$

Again in practice, $T_F$ need not go to the limit, to be sufficiently large to enable obtaining precise results. It will be realized that deriving the Fourier integral involves a scanning process. However, in this case, the scanning takes place with respect to an integrated wave, and consequently, if the scan wave is faster than or equal to the integration time, no signals will be missed.

In systems of the type briefly described above, several critical times must be observed. The first of these is the delay time of each section of the delay line. This sets a limit to the band width which may be covered by the system. At the present time, this delay time may be .01 microseconds, within the limitations established by current distributed signal amplifier practice, so that the total band covered by the unit may be as high as 100 megacycles if the resultant complexity is tolerable.

The total delay of the delay line, and hence the number of sections thereof, determines the resolution which may be obtained by systems of the character here involved. For example, with a 100 section line, each section having a delay of .01 microsecond, a total delay of 1 microsecond may be obtained, which provides a resolution of about 1 megacycle.

The integration time of the integrators utilized in the system must be large compared to the total delay of the system, but small enough so that the contribution to the integrated power in a channel caused by a burst, i.e. the power in the burst averaged over the integration time, may still be large. In the case under consideration, this integration time might well be 100 microseconds. The process of scanning the integrator circuits may, therefore, be done in about 100 microseconds, since as slow a speed as is practical, consistent with discharging each integrator at least once per integration period is desired. The Fourier integrator must, therefore, take a complete integral in 100 microseconds, on a 100 point curve. To do this to the required accuracy requires repeating the curve 100 times, each time multiplying the curve by a different frequency sine wave, or by multiplying the curve in 100 multipliers by 100 different frequency sine waves, integrating the output of each multiplier for at least 100 microseconds, and scanning the integrated outputs. The resultant may be displayed as a power spectrum on a cathode ray tube in the conventional manner.

Referring now more specifically to FIGURE 1 of the drawings, the reference numeral 1 identifies a wide band radio receiver, the specific band width of which may be selected in accordance with design of the remainder of the system of the present invention. The output of the wide band receiver 1 may be applied to a multi-section delay line, conventionally illustrated at 2, and which may have any desired number of delay sections, ten of which are illustrated for purposes of example, and the separate delay sections being identified by the reference numeral 2 followed by a letter of the alphabet corresponding with the specific section, so the first section is identified as 2a, the second section as 2b, etc. Connected to the output of each of the sections 2a, 2b . . . are isolating amplifiers, which are conventionally shown as triodes, having their control electrodes connected with the first triode 3 directly at the input of the delay line 2, with the second triode, 3a, connected to the output of the first delay line section 2a, with the following triode, 3b, connected to the output of the delay line section 2b, etc. The anodes of the triodes 3, 3a, 3b, 3c . . . are similarly connected to the sections of a further delay line 4. The output of the triode 3 is connected in parallel to input terminals of the multipliers 4a, 4b, 4c . . ., the outputs of the triodes 3a, 3b, 3c . . . being connected respectively to further input terminals of the multipliers 4a, 4b, 4c . . ., so that to the input of each one of the multipliers is applied signal deriving from the input to the delay line 2 and from a different one of the delay line sections 2a, 2b, 2c . . . The multipliers themselves are devices which are well known per se, for multiplying two voltages, and for deriving at the output thereof a voltage corresponding with the product of the two input voltages. Suitable multipliers are disclosed in the U.S. patents to Bedford #2,401,404 and to Wipff #2,401,447 referred to by way of illustrative example only, and without intending to limit the present system to any specific multiplier, from among those available in the art. Accordingly, the output of the $n$th multiplier will be given by Equation 1, supra.

At the output of each multiplier is provided an integrating circuit, the various integrating circuits being identified by the reference numerals 5a, 5b, 5c . . ., and the integrator 5a being connected at the output of the multiplier 4a, the integrator 5b at the output of the multiplier 4b, etc. At the output of each integrator will then be provided a voltage as established by Equation 2.

The outputs of the integrator circuits 5a, 5b, 5c . . . are scanned in succession by an electronic commutator 6, which may be of conventional arrangement and construction per se, the outputs of the electronic commutator 6 being applied on a lead 7, whereon is accordingly applied the voltage expressed by Equation 2 as a time varying function.

The voltage appearing on the line 7 is now passed to a Fourier integrator, which is known per se, and which provides a visual display of the frequency content of the original signal. The Fourier integrator includes, in FIGURE 1, a multiplier 8, which may be of the types disclosed in the U.S. patents to Wipff or Bedford, referred to hereinbefore, for each desired frequency component of the input signal, to which is applied the voltage appearing on the line 7 and also the voltage of a fixed oscillator 9, having a frequency corresponding with the desired frequency component. The output of the multiplier 8 is applied to an integrating circuit 10, which then supplies, for the selected frequency, the integral expressed in Equation 4. A multiplier (as 8a) and a suitable oscillator (as 9a) is provided for each frequency component which it is desired to display, and each of the multipliers is supplied with an integrator (as 10a). The integrators are all connected to the input of an electronic commutator 11 which serves to apply the outputs of the integrators 10, 10a . . . in succession to the vertical deflection electrode 12 of a cathode ray tube indicator 13. The operation of the electronic commutator is synchronized in response to pulse output derived from a pulse oscillator 14. The output of the pulse oscillator 14 is further used to synchronize a saw-tooth oscillator 15 the output of which is applied to the horizontal electrodes 16 of the cathode ray tube indicator 13. Accordingly, for each lateral position of the beam of the cathode ray tube indicator 13 a different one of the integrators 10, 10a . . . is being scanned, and the display on the face of the indicator 13 represents the voltages available at the integrators 10, 10a . . . plotted against a frequency base line.

In accordance with a further modification of the present invention, illustrated in FIGURE 2 of the drawings, the use of a plurality of multipliers 8, 8a . . ., oscillators 9, 9a . . ., integrators 10, 10a . . ., and electronic commutator 11, are dispensed with. This is possible since the output of each multiplier when integrated corresponds with a Fourier component of the original wave form introduced into the system, that component corresponding with the frequency of the oscillator connected to the input of the multiplier. In accordance with the modification of the present invention illustrated in FIGURE 2 of the accompanying drawings the input oscillator 20, which is applied to a multiplier 21, is frequency scanned at a relatively slow rate in response to a saw-tooth voltage provided by a saw-tooth generator 22, the saw-tooth voltage being applied similarly to the horizontal electrodes 16 of the cathode ray tube indicator 13. The output of the multiplier is applied to an integrator 23 from which is derived deflection voltage for application to the vertical deflection electrode 12 of the cathode ray tube indicator 13. The rate of scan of the frequency scanning oscillator 20 is made sufficiently slow so that it may be considered a steady frequency during each complete scan of the electronic commutator 6. By maintaining the frequency of the frequency scanning oscillator 20 substantially constant while the electronic commutator 6 scans the series of integrators 5a, 5b, 5c . . ., the voltage available at the integrator 23 becomes a measure of the amplitude of the Fourier component equal to the then frequency of the frequency scanning oscillator 20. As the frequency scanning oscillator 20 slowly varies in frequency and the commutator 6 continues periodically to scan and commutate the integrating circuits 5a, 5b, 5c . . ., the Fourier component which is represented at the integrator 23 changes, being always equal to the frequency of the frequency scanning oscillator 20. So long as the frequency scanning oscillator 20 scans at a sufficiently slow rate to enable at least one scan of the commutator 6 before the frequency oscillator 20 has changed frequency appreciably, and so long as the time constant of the integrating circuit 23 is made sufficiently small so that the voltage across the condenser of the integrating circuit 23 can follow the variations in amplitude at the output of the multiplier 21 due to changes of frequency of the frequency scanning oscillator 20, the display on the face of the indicator 13 will represent a true Fourier analysis of the input wave supplied by the wide band receiver 1.

While in the system of FIGURE 1 the commutator 6 may, if desired, be effective to discharge the integrating circuits 5a, 5b . . . at each cycle of commutation, this can no longer be true in the embodiment of the invention illustrated in FIGURE 2 of the drawings, wherein the integrators 5a, 5b . . . must retain their signals during a large number of commutation cycles, sufficient to enable completion of a scan of the frequency scanning oscillator 20.

When I have described and illustrated two specific modifications of the present invention, it will be realized that variations and modifications of the details of the circuits, and of the general arrangement thereof, may be resorted to without departing from the true spirit and scope of the invention.

What I claim and desire to secure by Letters Patent of the United States is:

1. In a spectrum analyzer, a wide band receiver, a delay line having multiple sections in cascade connected to receive output voltage from said wide band receiver, means for multiplying in each of a plurality of separate multipliers said output voltage and the delayed voltage output of a different one of said sections to provide a multiplied output, means for separately integrating each of said multiplied outputs, means for connecting said means for integrating in succession to all of a plurality of Fourier integrators, and means responsive to said Fourier integrators for visually displaying the frequency spectrum of said output voltage.

2. In a spectrum analyzer for analyzing a wide band spectrum of frequencies, a multiple section delay line, means for applying said spectrum to the input of said delay line, separate means for separately multiplying said spectrum by the output of each of said delay lines, means for integrating the output of each of said separate means for multiplying, a commutator for connecting the integrated outputs of said means for integrating to a common line, a series of multipliers having input circuits connected in parallel to said common line, a plurality of oscillators each of a different frequency and each connected to an input circuit of one of said multipliers, means for integrating the outputs of said multipliers, a cathode ray tube indicator having first and second deflection electrodes, means for periodically connecting said integrators in sequence to said first deflection electrodes, and means for periodically applying a base line generating voltage to said second deflection electrodes in synchronism with operation of said means for periodically connecting said integrators in sequence to said first deflection electrodes.

3. In a system for determining the magnitude of a Fourier component $f$ in a wave form, means for displacing said wave form in time by successively greater equal increments of time, means for obtaining a plurality of product functions each equal to the product of said wave form by one of said time displaced wave forms, means for integrating each of said product functions over a time 2T, means for obtaining a voltage corresponding with said magnitude comprising means for multiplying each of the integrated product functions by a sine function to obtain a succession of further product functions, and means for integrating said further product functions.

4. The combination in accordance with claim 3 wherein means is provided for continuously varying the frequency of said sine function to vary continuously the frequency of said Fourier component $f$.

5. In a spectrum analyzer for analyzing a wide band spectrum of frequencies, said spectrum of frequencies definable as a function of time $f_1(t)$, where $t$ is time, means responsive to said spectrum of frequencies for generating further spectra of said frequencies definable by the equations $f_1(t+\tau_n)$, where $\tau_n$ are delay times which take on a plurality of different values identified by the subscript $n$, means for forming the product $f_1(t)f_1(t+\tau_n)$ for each value of $\tau_n$, means for forming the integral $$\frac{1}{2T}\int_{-T}^{T} f_1(t)f_1(t+\tau_n)\,dt$$

for each value of $\tau_n$ and for translating said integral into a time function in $\tau_n$ as the independent variable, a Fourier integrator for obtaining the Fourier integral of said time function, and visual display means responsive to said Fourier integrator for visually displaying said wide band spectrum of frequencies.

6. In a wide band spectrum analyzer, means for transforming a voltage wave $f_1(t)$, $t$ being time, into a plurality of voltages $f_1(t)f_1(t+\tau_n)$ where $\tau_n$ represent delay time identified by the subscript $n$, means for integrating each of said voltages over a time period to provide an integrated voltage for each value of $\tau_n$, a Fourier integrator, means for applying said integrator voltages to said Fourier integrator in sequence, and means for deriving said wide band spectrum from said Fourier integrator.

7. In a system for isolating a Fourier component $f$ in a wave form $f_1(t)$, where $t$ is time, means for displacing said wave form $f_1(t)$ in time by a succession of delay times $\tau_n$, to provide wave forms $f_1(t+\tau_n)$, means for obtaining a plurality of product functions each equal to the product $f_1(t)f_1(t+\tau_n)$, for a value of $\tau_n$, means for integrating each of said product functions over a predetermined time, and means for obtaining a voltage corresponding with said Fourier component $f$ comprising means for multiplying the integrated product functions in succession by a sine wave of frequency $f$ to obtain a further product function of time, and integrating said further product function of time over a time period.

References Cited in the file of this patent

UNITED STATES PATENTS

| 1,315,539 | Carson | Sept. 9, 1919 |
| 2,099,536 | Scherbatskoy et al. | Nov. 16, 1937 |
| 2,410,233 | Percival | Oct. 29, 1946 |
| 2,416,895 | Bartelink | Mar. 4, 1947 |
| 2,444,445 | Isbister | July 6, 1948 |
| 2,465,355 | Cook | Mar. 29, 1949 |
| 2,491,189 | Long | Dec. 13, 1949 |
| 2,492,062 | Potter | Dec. 20, 1949 |